(12) United States Patent
Yi

(10) Patent No.: US 9,094,847 B2
(45) Date of Patent: Jul. 28, 2015

(54) METHOD, BASE STATION, AND WIRELESS COMMUNICATION SYSTEM FOR TRX MUTUAL AID

(71) Applicant: HUAWEI TECHNOLOGIES CO., LTD., Shenzhen (CN)

(72) Inventor: Dongji Yi, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 99 days.

(21) Appl. No.: 13/709,433

(22) Filed: Dec. 10, 2012

(65) Prior Publication Data

US 2013/0182556 A1 Jul. 18, 2013

Related U.S. Application Data

(63) Continuation of application No. PCT/CN2012/070669, filed on Jan. 20, 2012.

(30) Foreign Application Priority Data

Feb. 18, 2011 (CN) .......................... 2011 1 0040934

(51) Int. Cl.
*H04W 24/02* (2009.01)
*H04W 24/04* (2009.01)

(52) U.S. Cl.
CPC .............. *H04W 24/02* (2013.01); *H04W 24/04* (2013.01)

(58) Field of Classification Search
None
See application file for complete search history.

(56) References Cited

U.S. PATENT DOCUMENTS

| 5,239,538 | A | 8/1993 | Teel, Jr. et al. |
| 6,904,013 | B2 * | 6/2005 | Skoog et al. ................... 370/217 |
| 8,873,408 | B2 * | 10/2014 | Siomina et al. ............... 370/252 |
| 2002/0193147 | A1 | 12/2002 | Li et al. |
| 2009/0227262 | A1 | 9/2009 | Gao |

FOREIGN PATENT DOCUMENTS

| CN | 1722895 | * | 1/2006 |
| CN | 1866765 | | 11/2006 |
| CN | 101193402 A | | 6/2008 |

(Continued)

OTHER PUBLICATIONS

Chinese Office Action mailed Jul. 2, 2013 in corresponding Chinese Application No. 201110040934.4.

(Continued)

*Primary Examiner* — Rhonda Murphy
(74) *Attorney, Agent, or Firm* — Staas & Halsey LLP

(57) ABSTRACT

The present invention relates to a method, a base station, and a wireless communication system for TRX mutual aid, where the method comprises: obtaining, by the base station, capability information of a TRX board in the base station, and obtaining from a base station controller information of a cell to which a carrier that is configured on the TRX board belongs; and selecting, by the base station, a corresponding TRX mutual aid way according to the capability information and the information of the cell to perform TRX mutual aid with a faulty BCCH dominant frequency carrier. By implementing TRX mutual aid on the base station, the capability of the board can be easily learned, and the TRX mutual aid is performed based on the capability in comprehensive consideration of another carrier in the cell and standard configuration of the carriers, so that more carriers continue providing services.

16 Claims, 3 Drawing Sheets

(56) References Cited

FOREIGN PATENT DOCUMENTS

| CN | 101646183 | 2/2010 |
| CN | 102137417 | 7/2011 |
| EP | 0499736 | 8/1992 |
| EP | 1770910 | 4/2007 |
| EP | 1833270 A1 | 9/2007 |

OTHER PUBLICATIONS

"How to Find Hidden Faults for Huawei GSM Base Station", Xingtai Branch of China Unicorn Wu Junfeng, Communication World, China Academic Journal Electronic Publishing House, Dec. 8, 2002, pp. 36-38.

Extended European Search Report mailed Mar. 25, 2013 for corresponding European Application No. 12746779.3.

International Search Report issued Apr. 19, 2012 in corresponding International Patent Application No. PCT/CN2012/070669.

Written Opinion of the International Searching Authority issued Apr. 19, 2012 in corresponding International Patent Application No. PCT/CN2012/070669.

Russian Office Action issued Sep. 25, 2014 in corresponding Russian Patent Application No. 2013142456/07.

\* cited by examiner

METHOD, BASE STATION, AND WIRELESS COMMUNICATION SYSTEM FOR TRX MUTUAL AID

CROSS-REFERENCE TO RELATED APPLICATIONS

This application is a continuation of International Application No. PCT/CN2012/070669, filed on Jan. 20, 2012, which claims priority to Chinese Patent Application No. 201110040934.4, filed on Feb. 18, 2011, both of which are hereby incorporated by reference in their entireties.

FIELD OF THE INVENTION

The present invention relates to a wireless communication technology, and in particular, to a method, a base station, and a wireless communication system for TRX mutual aid.

BACKGROUND OF THE INVENTION

TRX (transceiver) mutual aid is also dominant B mutual aid, which is in a case that a fault occurs in a dominant frequency (the dominant B) carrier, a non-dominant B carrier is automatically adjusted to be the dominant frequency carrier, and services of the non-dominant B carrier are not affected. The dominant B carrier is a dominant broadcast control channel (BCCH) carrier, which is used to bear various control signaling on a BCCH channel, and can be used for cell broadcast.

After a fault occurs in the dominant B carrier, a base station controller selects a candidate carrier to implement the dominant B mutual aid. The dominant B mutual aid operation is transparent to a base station, and single-carrier mutual aid is implemented, that is, a normal carrier undertakes duty of the dominant B and pays no attention to another carrier in a cell.

Before a multi-carrier appears, a physical board bears a carrier, and carriers have relatively small influences on each other, and therefore, it is relatively easy to implement the TRX mutual aid. After a multi-carrier technology is implemented, each physical board can bear relatively many carriers, such as six carriers and eight carriers. Based on hardware limitation, each physical board can neither support all frequency bands, nor support an infinite transmit power, and therefore, the TRX mutual aid has relatively large influences on services.

After a multi-standard technology is implemented, a TRX board, namely the physical board, can support various wireless standards, such as GSM and WCDMA, at the same time. Compared with another standard, a base station controller at the GSM side cannot learn configuration information of a carrier in another standard, such as the WCDMA, where the configuration information of the carrier is configured by a same TRX board, in this way, the TRX mutual aid is caused to easily affect normal services of carriers in another standard. It is assumed that there are two boards, board A and board B, and board A is configured with the dominant B carrier, if the dominant B carrier needs to be cooperated from board A to board B, but because the base station controller does not have configuration information on board B, it may cause that services in another standard on board B are affected after the dominant B mutual aid.

To solve the foregoing problem in the prior art, information of all standards is reported to the base station controller, but each base station controller may be connected with hundreds even thousands of carriers and an amount of data processing is very huge, thereby causing radical increase to the load of the base station controller. Also, if a new TRX support specification appears, the base station controller further needs matched modifications, thereby causing that a smooth upgrade of the base station cannot be implemented. In addition, the BSC can only implement single-carrier mutual aid. It is assumed that a cell has two boards, where one is configured with five carriers, and the other is configured with one carrier; if a fault occurs in the board which is configured with five carriers (including the dominant B carrier), only one-to-one dominant B mutual aid can be implemented, so that only one carrier in the cell provides services. Specifically, in the two boards in the cell, in a case that a fault occurs in the board which is configured with five carriers and where the dominant B carrier is located, only the dominant B carrier exchanges the configuration with the carrier on the other board (in normal operation), while other faulty carriers are still configured on the faulty board, and therefore, only one carrier provides services, thereby resulting in service congestion.

SUMMARY OF THE INVENTION

The embodiments of the present invention provide a method, a base station, and a wireless communication system for TRX mutual aid.

An embodiment of the present invention provides a TRX mutual aid method, which includes:
  obtaining, by a base station, capability information of a TRX board in the base station, and obtaining from a base station controller information of a cell to which a carrier that is configured on the TRX board belongs; and
  selecting, by the base station, a corresponding TRX mutual aid way according to the capability information and the information of the cell, and performing TRX mutual aid on a faulty dominant frequency carrier.

An embodiment of the present invention further provides a base station, which includes:
  a first information obtaining unit, configured to obtain capability information of a TRX board in the base station, and obtain from a base station controller information of a cell to which a carrier that is configured on the TRX board belongs; and
  a mutual aid unit, configured to select a corresponding TRX mutual aid way according to the capability information and the information of the cell, and perform TRX mutual aid on a faulty dominant frequency carrier.

An embodiment of the present invention further provides a wireless communication system, which includes a base station controller and the foregoing base station.

In the foregoing embodiments, by implementing dominant B mutual aid on the base station, the capability of a board can be easily learned, based on this the dominant B mutual aid is performed in comprehensive consideration of another carrier in the cell and standard configuration of the carriers, so that more carriers continue providing services, and in the prior art, a problem of service congestion resulting from single-carrier mutual aid and a problem of radical increase to load of the BSC resulting from multiple standards are mitigated.

BRIEF DESCRIPTION OF THE DRAWINGS

To illustrate the technical solutions of the embodiments of the present invention more clearly, the accompanying drawings required for describing the embodiments are briefly introduced in the following. Apparently, the accompanying drawings in the following description are merely some embodiments of the present invention, and persons of ordi

DETAILED DESCRIPTION OF THE EMBODIMENTS

The technical solutions of the embodiments of the present invention are described clearly and completely in the following with reference to the accompanying drawings in the embodiments of the present invention. Apparently, the embodiments to be described are only a part of rather than all of the embodiments of the present invention. All other embodiments which are derived by persons of ordinary skill in the art based on the embodiments of the present invention without creative efforts shall fall within the protection scope of the present invention.

Figure 1:
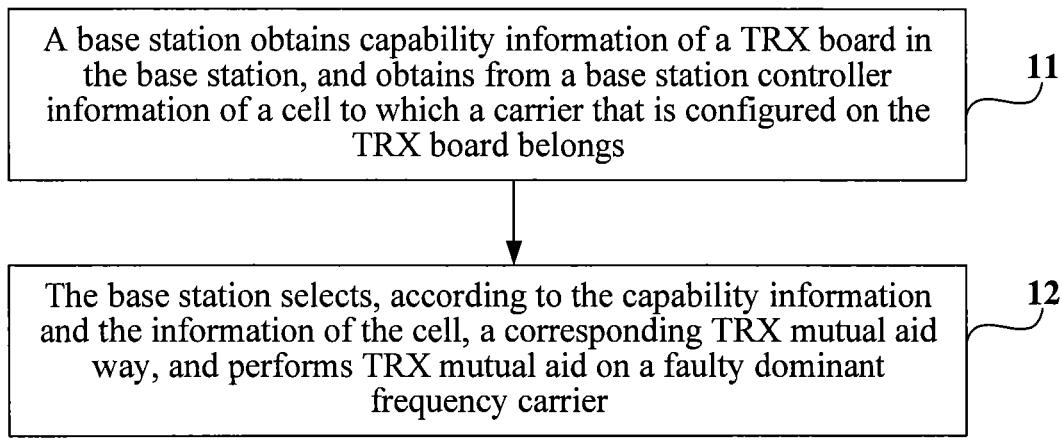
- FIG. 1 is a flow chart of a TRX mutual aid method according to an embodiment of the present invention.

FIG. 1 is a flow chart of a TRX mutual aid method according to an embodiment of the present invention. As shown in FIG. 1, the TRX mutual aid method includes:

Step 11: A base station obtains capability information of a TRX board in the base station, and obtains from a base station controller information of a cell to which a carrier that is configured on the TRX board belongs.

Specifically, the base station obtains the capability information of the TRX board in the base station, and the capability information of the TRX board includes the number of carriers which can be configured on the TRX board. In addition, the capability information of the TRX board can further include power supported by the board, and a bandwidth and a frequency band that are supported by the board.

When the TRX board is in a single-standard, the base station may obtain board capability information from the TRX board, and obtain the information of the cell from the base station controller. Since configuration information includes the information of the cell to which the carrier belongs, during implementation, the information of the cell may be obtained through a manner of obtaining the configuration information. In addition, the configuration information may further include a frequency point of the carrier and power of the carrier.

When the TRX board is in a dual-standard or multi-standard, the base station may obtain the board capability information from the TRX board. The base station can obtain from the base station controller configuration information of a carrier which is in a certain standard (for example, GSM) and on which the TRX mutual aid is performed, and the base station may obtain from the TRX board where the carrier is located configuration information of the carrier in another standard on the TRX board. If on a TRX board, a faulty dominant frequency carrier is in the GSM standard, and another TRX board where the TRX mutual aid is performed is in the dual-standard, that is, a carrier which is in the GSM standard and on which the TRX mutual aid is performed with the faulty dominant frequency carrier is configured, and the carrier in another standard such as a carrier in a UMTS standard is also configured. And then, for the carrier in the GSM standard, the base station can obtain from a corresponding base station controller the configuration information of the carrier in the GSM standard, which includes the information of a cell to which the carrier in the GSM standard belongs, and obtain from the TRX board the UMTS configuration information of the carrier in another standard such as in the UMTS standard.

Step 12: The base station selects a corresponding TRX mutual aid way according to the capability information and the information of the cell, and performs TRX mutual aid on the faulty dominant frequency carrier.

Specifically, when all carriers on the TRX board in normal operation and all carriers on the TRX board where the faulty dominant frequency carrier is located belong to a same cell, and in a case that the carrier capability (namely, the number of configurable carriers) of the TRX board in normal operation is larger than or equal to the carrier capability of the TRX board where the faulty dominant frequency carrier is located, the base station can configure all carriers on the TRX board where the faulty dominant frequency carrier is located on the TRX board in normal operation for implementing TRX mutual aid. Further, an original carrier on the TRX board in normal operation can further be configured on the TRX board where the faulty dominant frequency carrier is located.

Alternatively, the base station selects, according to the capability information and the information of the cell, a carrier on the TRX board in normal operation to perform the TRX mutual aid with the faulty dominant frequency carrier, and the selected carrier and the faulty dominant frequency carrier belong to a same cell. Here, the TRX mutual aid method provided in the embodiment of the present invention can further include: the base station obtains from the TRX board in normal operation the configuration information of a carrier in a standard different from that of the dominant frequency carrier; where the selecting, by the base station, according to the capability information and the information of the cell, a carrier on the TRX board in normal operation includes: the base station selects, according to the capability information and the configuration information of the carrier in the standard different from that of the dominant frequency carrier, a carrier on the TRX board in normal operation to perform the TRX mutual aid with the faulty dominant frequency carrier; and another carrier service on the TRX board in normal operation keeps working normally after the TRX mutual aid. That is, after the TRX mutual aid is performed on the selected carrier and the faulty dominant frequency carrier, another carrier service on the TRX board in normal operation is not affected, and no standard conflicts occur.

In the foregoing embodiment, by implementing the dominant B mutual aid on the base station, the capability of the board can be easily learned, based on this the dominant B mutual aid is performed in comprehensive consideration of another carrier in the cell and standard configuration of the carriers, so that more carriers continue providing services, and in the prior art, a problem of service congestion resulting from single-carrier mutual aid and a problem of radical increase to load of the BSC resulting from multiple standards are mitigated.

Figure 2:
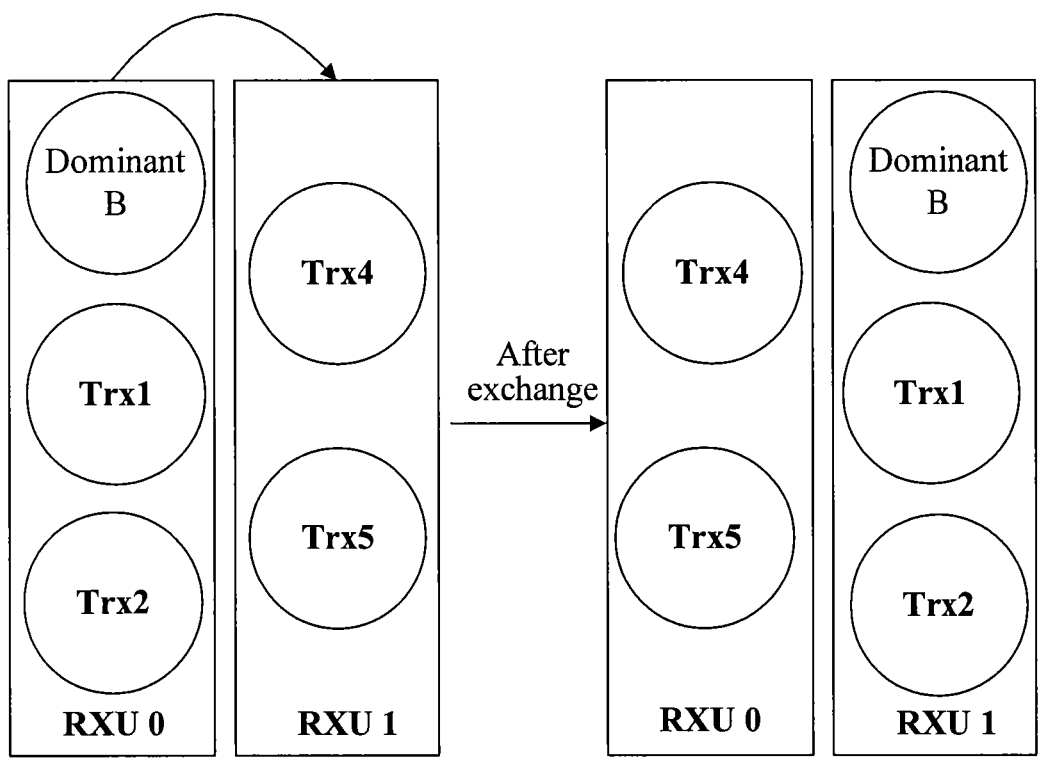
FIG. 2 is a schematic diagram of TRX mutual aid of another TRX mutual aid method according to an embodiment of the present invention.

FIG. 2 is a schematic diagram of TRX mutual aid of another TRX mutual aid method according to an embodiment of the present invention. In this embodiment, a certain cell has five carriers as shown in FIG. 2: dominant B, Trx1, Trx2, Trx4, and Trx5. Carriers dominant B, Trx1, and Trx2 are configured on a TRX board RXU0, and carriers Trx4 and Trx5 are configured on a TRX board RXU1. When a fault occurs in the board where the dominant B carrier is located, that is, the fault occurs in the TRX board RXU0, the carriers Trx1 and Trx2 on the board cannot be used. The base station learns from the TRX board RXU0 that the board is configured with three carriers, the dominant B, Trx1, and Trx2, and the fault occurs in the carrier dominant B, namely, the dominant frequency carrier, and learns from the TRX board RXU1 that the board is in normal operation and supports three carriers to be configured, namely, it has the capability of being configured with at least three carriers, and then the base station exchanges all carriers on the TRX board RXU0 with carriers on the TRX board RXU1, namely, configures the TRX board RXU1 with three carriers, the dominant B, Trx1, and Trx2 on the TRX board RXU0, and configures the TRX board RXU0 with original carriers Trx4 and Trx5 on the TRX board RXU1, so as to provide corresponding services. If an operator finds that the fault occurs in the TRX board RXU0 through an alarm from an alarm console and replaces the board, these two carriers can also provide services.

In this embodiment, the dominant B mutual aid is executed by the base station, and all carriers on the TRX board RXU0 are exchanged with the TRX board RXU1, so that at least three carriers in the cell can work normally. Compared with the mutual aid implemented on the carrier dominant B and the carrier Trx4 or the carrier Trx5 at a base station controller side in the prior art that at most two carriers in the cell work normally, the present invention increases a carrier availability ratio, and reduces influences on services resulting from the TRX mutual aid to the greatest extent.

Figure 3:
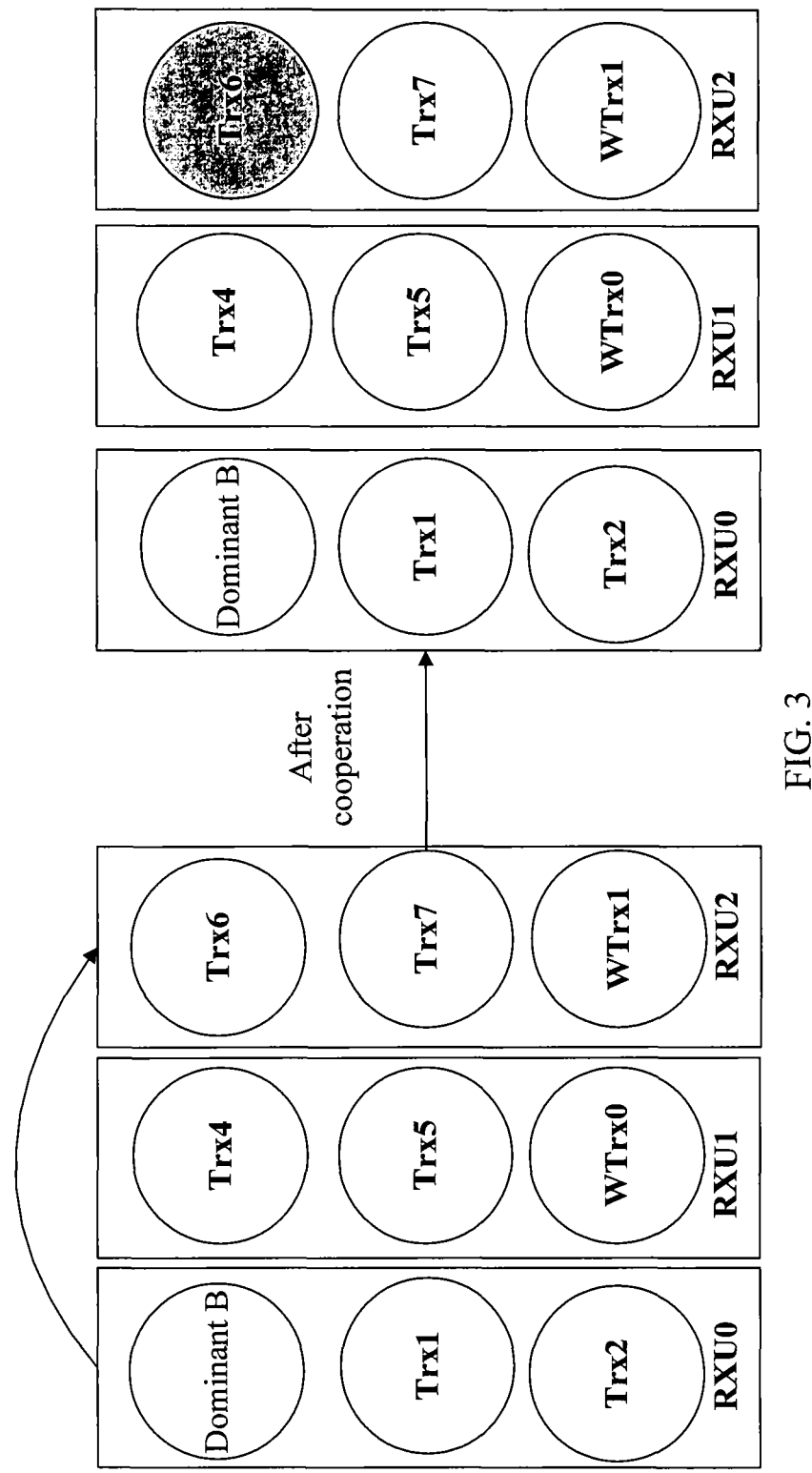
FIG. 3 is a schematic diagram of TRX mutual aid of another TRX mutual aid method according to an embodiment of the present invention.

FIG. 3 is a schematic diagram of TRX mutual aid of another TRX mutual aid method according to an embodiment of the present invention. In this embodiment, a TRX board RXU0 is configured with carriers dominant B, Trx1, and Trx2, a TRX board RXU1 is configured with carriers Trx4, Trx5, and WTrx0, and a TRX board RXU2 is configured with carriers Trx6, Trx7, and WTrx1. The carriers Trx4 to Trx7 are in a same standard as the carrier dominant B, and the carriers WTrx0 and WTrx1 are in a standard different from that of the carrier dominant B, and therefore, the TRX board RXU1 and the TRX board RXU2 are dual-standard boards.

A base station can obtain, from a base station controller, configuration information of the carrier dominant B and the carriers Trx4 to Trx7 on the TRX boards, which includes information of a cell to which the carriers belong. The base station can obtain the configuration information of the carrier WTrx0 from the TRX board RXU1, and obtain the configuration information of the carrier WTrx1 from the TRX board RXU2. When a fault occurs in the carrier dominant B (or a fault occurs in the TRX board RXU0), the base station can determine that, according to the foregoing obtained configuration information, if the mutual aid is performed on the carrier dominant B and the carrier Trx4 or Trx5 on the TRX board RXU1, the normal work of the carrier WTrx0 in another standard is affected, but if the mutual aid is performed on the carrier dominant B and the carrier Trx6 on the TRX board RXU2, another carrier service (including carriers in different standards) on the TRX board RXU2 can also keep in normal operation, and therefore, the carriers dominant B, carriers Trx4 to Trx7, and carriers WTrx0 and WTrx1 in another standard can all work normally. In this embodiment, the base station preferentially selects the carrier Trx6 to perform mutual aid, namely, uses the carrier Trx6 to implement the carrier dominant B, and a serial number of the carrier remains unchanged and is still Trx6.

In this embodiment, the base station directly communicates with the TRX board to obtain information in time, and selects the carrier according to the obtained information to perform the TRX mutual aid, which avoids conflicts, and solves a problem in the prior art that the normal work of the service in another standard is affected because the BSC does not know the data information of the configuration in another standard and it is caused that there are conflicts with a bandwidth or power of the carrier in another standard after the mutual aid. It is realized that at a G side, namely, in a GSM standard, the service TRX work can be maximally provided, and it can also be guaranteed that the normal operation of the carrier in another standard is not affected.

The technical solution provided in the foregoing method embodiment implements mutual aid when the fault occurs in the dominant B in dual-standard and multi-standard scenes, so that the cell can provide services, and at the same it is guaranteed that the normal work in another standard is not affected, thereby driving the smooth evolution of the base station from the GSM standard to the dual-standard and the multi-standard. When hardware of the base station changes and the standard (for example, dual-standard) evolves subsequently, only matched modification of a version of the base station is needed, and the base station controller (BSC) does not need to pay attention to this kind of information. In the subsequent version upgrade of the base station, the BSC is not required to update correspondingly as a dominant B mutual aid strategy changes.

Persons of ordinary skill in the art may understand that the implementation of all or a part of the steps of the foregoing method embodiments may be accomplished by a program instructing relevant hardware. The foregoing program may be stored in a computer readable storage medium. When the program runs, the steps of the foregoing method embodiments are executed. The foregoing storage medium include various mediums which are capable of storing program codes, such as a ROM, a RAM, a magnetic disk, or a compact disk.

Figure 4:
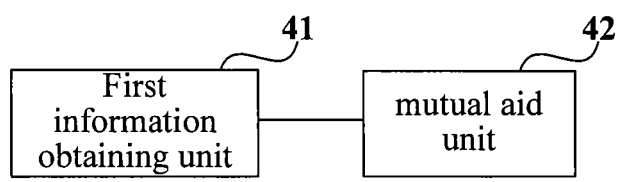
FIG. 4 is a schematic structural diagram of a base station which is used to implement the foregoing TRX mutual aid method according to an embodiment of the present invention.

FIG. 4 is a schematic structural diagram of a base station which is used to implement the foregoing TRX mutual aid method according to an embodiment of the present invention. As shown in FIG. 4, the base station includes a first information obtaining unit 41 and a mutual aid unit 42.

The first information obtaining unit 41 is configured to obtain capability information of a TRX board in the base station, and obtain from a base station controller information of a cell to which a carrier that is configured on the TRX board belongs; for details, reference is made to description in the foregoing step 11. The mutual aid unit 42 is configured to select a corresponding TRX mutual aid way according to the capability information and the information of the cell, and perform TRX mutual aid on a faulty dominant frequency carrier; for details, reference is made to description in the foregoing step 12.

The mutual aid unit 42 can be specifically configured to, mutual aid when all carriers on a TRX board in normal operation and all carriers on a TRX board where the faulty dominant frequency carrier is located belong to a same cell, and the carrier capability of the TRX board in normal operation is larger than or equal to the carrier capability of the TRX board where the faulty dominant frequency carrier is located, configure all carriers on the TRX board where the faulty dominant frequency carrier is located on the TRX board in normal operation for implementing TRX mutual aid. The mutual aid unit 42 can further be configured to configure an original carrier on the TRX board in normal operation onto the TRX board where the faulty dominant frequency carrier is located.

The mutual aid unit 42 can be further specifically configured to select, according to the capability information and the information of the cell, a carrier from the TRX board in normal operation to perform the TRX mutual aid with the faulty dominant frequency carrier. The selected carrier and the faulty dominant frequency carrier belong to a same cell, and after the TRX mutual aid with the faulty dominant frequency carrier, another carrier service on the TRX board in normal operation is not affected, and no standard conflicts occur either.

The base station provided in the embodiment of the present invention can further include a second information obtaining unit, which is configured to obtain, from the TRX board in normal operation, configuration information of a carrier in a standard different from that of the dominant frequency carrier.

The mutual aid unit is further configured to select, according to the capability information and the configuration information of the carrier whose standard is different from that of the dominant frequency carrier, a carrier from the TRX board in normal operation to perform the TRX mutual aid with the faulty dominant frequency carrier. Another carrier service on the TRX board in normal operation keeps working normally after the TRX mutual aid.

In this embodiment, the base station can easily learn the capability of the board through the information obtaining unit, accordingly, through the mutual aid unit, and based on this, the dominant B mutual aid is performed in comprehensive consideration of another carrier in the cell and the standard configuration of the carriers, so that more carriers continue providing services, and in the prior art, a problem of service congestion resulting from single-carrier mutual aid and radical increase to load of the BSC resulting from multiple standards are mitigated.

Figure 5:
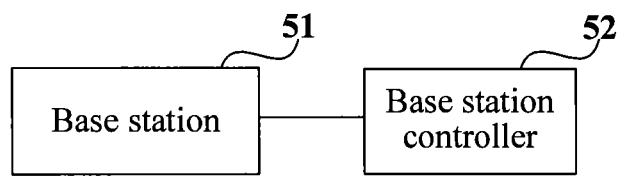
FIG. 5 is a schematic structural diagram of a wireless communication system which is used to implement the foregoing TRX mutual aid method according to an embodiment of the present invention.

FIG. 5 is a schematic structural diagram of a wireless communication system which is used to implement the foregoing TRX mutual aid method according to an embodiment of the present invention. As shown in FIG. 5, the wireless communication system includes a base station 51 and a base station controller 52. The base station 51 communicates with the base station controller 52, and is configured to obtain from the base station controller 52 information of a cell to which a carrier that is configured on a board belongs. The base station 51 can be any one of the base stations provided in the foregoing apparatus embodiments.

In this embodiment, the wireless communication system can easily learn the capability of the board by performing dominant B mutual aid on the base station, and the dominant B mutual aid is performed based on the capability in comprehensive consideration of another carrier in the cell and standard configuration of the carriers, so that more carriers continue providing services, and in the prior art, a problem of service congestion resulting from single-carrier mutual aid and a problem of radical increase to load of the BSC resulting from multiple standards are mitigated.

For shortcomings of the solutions in the prior art, in the foregoing method, device, and system embodiments, the dominant B mutual aid is performed on the base station to implement distributed processing of data, and only software on the base station needs to be modified to support future developments of more types of dual-standard and multi-standard technologies, which mitigates a problem in the prior art that the board capability enhancement cannot be smoothly supported due to the dominant B mutual aid by using the BSC and if a TRX capability such as a bandwidth or supporting power is enhanced, the version of the BSC needs to be upgraded to support the dominant B mutual aid, thereby driving the smooth evolution of the multi-standard technology better.

Finally, it should be noted that the foregoing embodiments are merely provided for describing the technical solutions of the present invention, but not intended to limit the present invention. It should be understood by persons of ordinary skill in the art that although the present invention is described in detail with reference to the foregoing embodiments, modifications can still be made to the technical solutions recorded in the foregoing each embodiment, or equivalent replacements can still be made to some technical features in the technical solutions, while these modifications or replacements do not cause the essence of corresponding technical solutions to depart from the spirit and scope of the technical solutions of each embodiment of the present invention.

What is claimed is:

1. A TRX mutual aid method comprising:
   obtaining, by a base station, capability information of at least two TRX boards in the base station, from the at least two TRX boards;
   obtaining, by the base station from a base station controller, information of cells to which carriers that are configured on the at least two TRX boards belong; and
   selecting, by the base station, a corresponding TRX mutual aid way according to the capability information obtained by the base station and the information of the cells obtained by the base station, and performing TRX mutual aid on a faulty BCCH carrier in accordance with the selected TRX mutual aid way,
   wherein the selecting, by the base station, the corresponding TRX mutual aid way according to the capability information obtained by the base station and the information of the cells obtained by the base station, and performing the TRX mutual aid on the faulty BCCH carrier comprises:
   configuring, by the base station, all carriers on a TRX board of the at least two TRX boards where the faulty BCCH carrier is located onto a TRX board of the at least two TRX boards in normal operation for implementing the TRX mutual aid, when all carriers on the TRX board of the at least two TRX boards in normal operation and all carriers on the TRX board of the at least two TRX boards where the faulty BCCH carrier is located belong to a same cell, and the carrier capability of the TRX board of the at least two TRX boards in normal operation is larger than or equal to the carrier capability of the TRX board of the at least two TRX boards where the faulty BCCH carrier is located.

2. The TRX mutual aid method according to claim 1, wherein the method further comprises: configuring an original carrier on the TRX board of the at least two TRX boards in normal operation onto the TRX board of the at least two TRX boards where the faulty BCCH carrier is located.

3. The TRX mutual aid method according to claim 1, wherein the selecting, by the base station, the corresponding TRX mutual aid way according to the capability information obtained by the base station and the information of the cells obtained by the base station, and performing the TRX mutual aid on the faulty BCCH carrier comprises:
   selecting, by the base station, according to the capability information obtained by the base station and the information of the cells obtained by the base station, a carrier on a TRX board of the at least two TRX boards in normal operation to perform the TRX mutual aid with the faulty BCCH carrier, wherein the selected carrier and the faulty BCCH carrier belong to a same cell.

4. The TRX mutual aid method according to claim 1, wherein, for each respective TRX board of the at least two TRX boards, the information of the cells is obtained through a manner of obtaining configuration information from the base station controller.

5. The TRX mutual aid method according to claim 1, wherein
the method further comprises, for each respective TRX board of the at least two TRX boards, obtaining, by the base station, frequency points of carriers and powers of the carriers on the respective TRX board; and
the selecting selects a TRX mutual aid way in accordance with the obtained frequency points and powers.

6. A TRX mutual aid method comprising:
obtaining, by a base station, capability information of at least two TRX boards in the base station, from the at least two TRX boards;
obtaining, by the base station from a base station controller, information of cells to which carriers that are configured on the at least two TRX boards belong;
selecting, by the base station, a corresponding TRX mutual aid way according to the capability information obtained by the base station and the information of the cells obtained by the base station, and performing TRX mutual aid on a faulty BCCH carrier in accordance with the selected TRX mutual aid way, wherein
the selecting, by the base station, the corresponding TRX mutual aid way according to the capability information obtained by the base station and the information of the cells obtained by the base station, and performing the TRX mutual aid on the faulty BCCH carrier comprises:
selecting, by the base station, according to the capability information obtained by the base station and the information of the cells obtained by the base station, a carrier on a TRX board of the at least two TRX boards in normal operation to perform the TRX mutual aid with the faulty BCCH carrier, wherein the selected carrier and the faulty BCCH carrier belong to a same cell, and
the method further comprises:
obtaining, by the base station, from the TRX board of the at least two TRX boards in normal operation, configuration information of a carrier in a standard different from that of the BCCH carrier, and
the selecting, by the base station, according to the capability information obtained by the base station and the information of the cells obtained by the base station, a carrier from the TRX board of the at least two TRX boards in normal operation comprises: selecting, by the base station, according to the capability information obtained by the base station and the configuration information of the carrier whose standard is different from that of the BCCH carrier obtained by the base station, a carrier on the TRX board of the at least two TRX boards in normal operation to perform the TRX mutual aid with the faulty BCCH carrier; wherein another carrier service on the TRX board of the at least two TRX boards in normal operation keeps working normally after the TRX mutual aid.

7. The TRX mutual aid method according to claim 6, wherein, for each respective TRX board of the at least two TRX boards, the capability information of the respective TRX board obtained by the base station comprises the number of carriers which can be configured on the respective TRX board.

8. The TRX mutual aid method according to claim 7, wherein, for each respective TRX board of the at least two TRX boards, the capability information of the respective TRX board obtained by the base station further comprises power supported by the respective TRX board, and a bandwidth and a frequency band that are supported by the respective TRX board.

9. A base station comprising:
a first information obtaining unit, configured to obtain capability information of at least two TRX boards in the base station from the at least two TRX boards, and obtain, from a base station controller, information of cells to which carriers that are configured on the at least two TRX boards belong; and
a mutual aid unit, configured to select a corresponding TRX mutual aid way according to the capability information and the information of the cells obtained by the first information obtaining unit, and perform TRX mutual aid on a faulty BCCH carrier in accordance with the selected TRX mutual aid way,
wherein the mutual aid unit is specifically configured to configure all carriers on a TRX board of the at least two TRX boards where the faulty BCCH carrier is located onto a TRX board of the at least two TRX boards in normal operation for implementing the TRX mutual aid, when all carriers on the TRX board of the at least two TRX boards in normal operation and all carriers on the TRX board of the at least two TRX boards where the faulty BCCH carrier is located belong to a same cell, and the carrier capability of the TRX board of the at least two TRX boards in normal operation is larger than or equal to the carrier capability of the TRX board of the at least two TRX boards where the faulty BCCH carrier is located.

10. The base station according to claim 9, wherein the mutual aid unit is further configured to configure an original carrier on the TRX board of the at least two TRX boards in normal operation onto the TRX board of the at least two TRX boards where the faulty BCCH carrier is located.

11. The base station according to claim 9, wherein the mutual aid unit is specifically configured to select, according to the capability information and the information of the cells obtained by the first information obtaining unit, a carrier on a TRX board of the at least two TRX boards in normal operation to perform the TRX mutual aid with the faulty BCCH carrier, and the selected carrier and the faulty BCCH carrier belong to a same cell.

12. The base station according to claim 9, wherein, for each respective TRX board of the at least two TRX boards, the capability information of the respective TRX board comprises the number of carriers which can be configured on the respective TRX board.

13. The base station according to claim 12, wherein, for each respective TRX board of the at least two TRX boards, the capability information of the respective TRX board further comprises power supported by the respective TRX board, and a bandwidth and a frequency band that are supported by the respective TRX board.

14. The base station according to claim 9, wherein the information of the cells is obtained through a manner of obtaining configuration information from the base station controller.

15. The base station according to claim 14, wherein,
for each respective TRX board of the at least two TRX boards, the first information obtaining unit further obtains frequency points of the carriers and power of the carriers on the respective TRX board, and the mutual aid unit selects a TRX mutual aid way in accordance with the obtained frequency points and powers.

16. A base station comprising:
a first information obtaining unit, configured to obtain capability information of at least two TRX boards in the base station, from the at least two TRX boards, and obtain, from a base station controller, information of cells to which carriers that are configured on the at least two TRX boards belong; and
a mutual aid unit, configured to select a corresponding TRX mutual aid way according to the capability information and the information of the cells obtained by the first information obtaining unit and perform TRX mutual aid on a faulty BCCH carrier in accordance with the selected TRX mutual aid way, wherein
the mutual aid unit is specifically configured to select, according to the capability information and the information of the cells obtained by the first information obtaining unit, a carrier on a TRX board of the at least two TRX boards in normal operation to perform the TRX mutual aid with the faulty BCCH carrier, and the selected carrier and the faulty BCCH carrier belong to a same cell, and the base station further comprises:
a second information obtaining unit, configured to obtain, from the TRX board of the at least two TRX boards in normal operation, configuration information of a carrier in a standard different from that of the BCCH carrier, and
the mutual aid unit is further configured to select, according to the capability information and the configuration information of the carrier whose standard is different from that of the BCCH carrier, a carrier from the TRX board of the at least two TRX boards in normal operation to perform the TRX mutual aid with the faulty BCCH carrier, wherein another carrier service on the TRX board of the at least two TRX boards in normal operation keeps working normally after the TRX mutual aid.

* * * * *